Dec. 29, 1925.  1,567,438
G. O. HEINE
VENTILATOR FOR MOVABLE CONVEYANCES
Filed Nov. 27, 1923
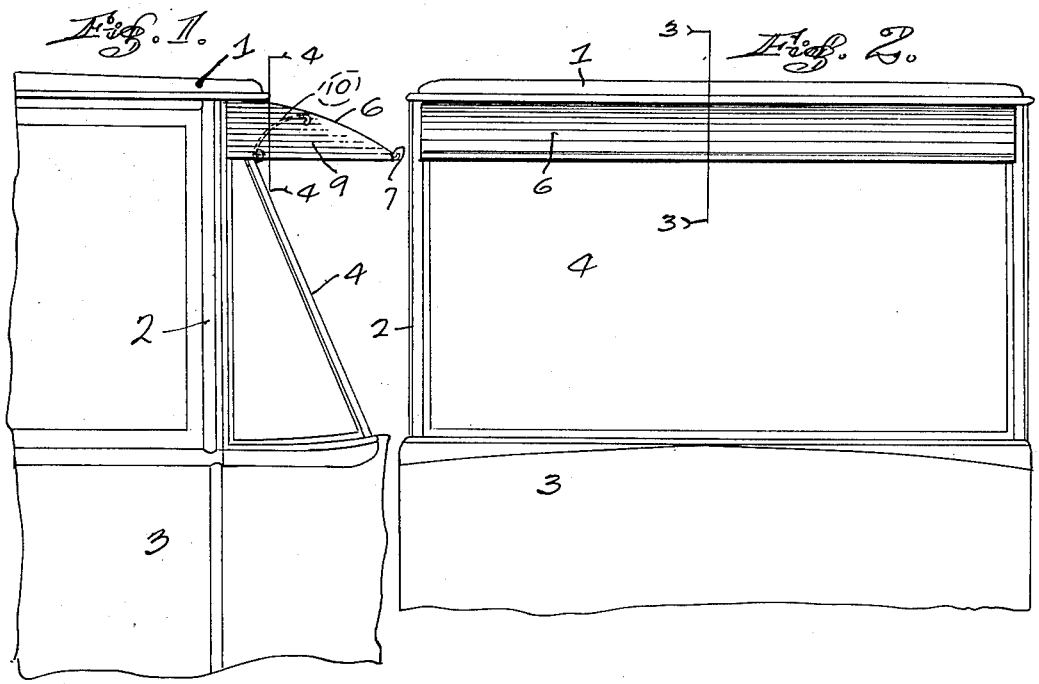
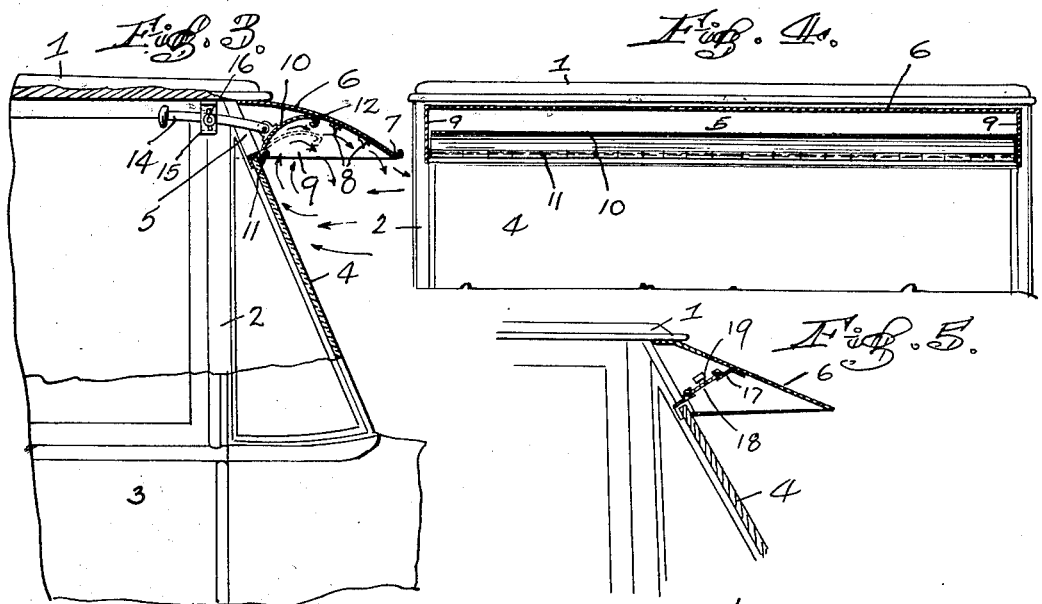
INVENTOR
GUSTAVE O. HEINE
BY ATT'Y Patented Dec. 29, 1925.

1,567,438

UNITED STATES PATENT OFFICE.

GUSTAVE O. HEINE, OF SAN FRANCISCO, CALIFORNIA.

VENTILATOR FOR MOVABLE CONVEYANCES.

Application filed November 27, 1923. Serial No. 677,272.

*To all whom it may concern:*

Be it known that I, GUSTAVE O. HEINE, a citizen of Germany, and a resident of the city and county of San Francisco, State of California, have made a new and useful invention—to wit, Improvements in Ventilators for Movable Conveyances, and I do hereby declare the following to be a full, clear, concise, and exact description of the same.

This invention relates particularly to a ventilating device adapted to be incorporated in the windshield of a movable conveyance, whereby fresh clean air may be circulated within the interior of said conveyance and dust and fluid particles excluded therefrom.

An object of the invention is to provide a ventilating device which may be formed as an integral part of an automobile windshield and adapted to operate in conjunction with a visor, adjacent said windshield, by means of which air may be circulated into the area desired to be ventilated, free of all deleterious substances.

A further object of the invention is to provide a draft regulating device which may be adjusted to regulate and control the volume and amount of air admitted into or from the area desired to be ventilated.

Other objects of the invention are to provide a ventilating device constructed and arranged relative to cooperating members so that fluid and dust particles may be prevented from passing; and a ventilator which will be superior in point of simplicity and inexpensiveness of construction, positiveness of operation, and facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings.

Fig. 1 represents a side elevation of a fragmentary portion of the body of a vehicle.

Fig. 2 is a front elevation of Fig. 1.

Fig. 3 is a cross-section taken through Fig. 2 on the line 3—3.

Fig. 4 is a section taken through Fig. 1 on the line 4—4.

Fig. 5 is a modified form of ventilator.

All conveyances such as trains, boats and vehicles, particularly motor vehicles of the "closed" type, whether provided with side windows which may be opened in various ways, or equipped with semi-permanent enclosing curtains, present a perplexing problem where good ventilation is desired, and likewise where it is desired to exclude either hot or cold weather. The ideal ventilation is that which would be obtained if the air were to be permitted to pass directly through the windshield, but the desirability and necessity of a windshield is paramount to the problem of perfect ventilation. In my invention I have constructed means in the windshield, which without in any way diminishing the visual efficiency of or destroying the protective properties of said windshield, provides an efficient ventilating apparatus, which will permit of the circulating of fresh and pure air through said windshield.

In detail, the construction illustrated in the drawings comprises, the body of an automobile formed of a top 1, connected by frames or stanchion members 2 to the tonneau 3 of said automobile. The fore part of the body is provided with a conventional windshield 4 bounded on its four sides by the top 1 framing 2 and tonneau 3. The windshield 4 is mounted in its supporting frame to allow for weaving and other tortional stresses. In accordance with modern practice the windshield 4 lies on a slant. The windshield 4 covers substantially the entire front area between the top 1 and tonneau 3 across the said automobile, a space 5 being provided between the upper edge of the said windshield 4 and top 1.

A sun visor or hood 6 is secured to the front edge of the top 1, or the said top 1 may be extended beyond the windshield 4 to function as a visor. The hood is formed of glass or metal or other equivalent material but in the practice of my invention I have found that sheet metal is to be preferred. The hood 6 is extended beyond the front face of the windshield 4 in an angular position relative thereto. The hood 6 is provided with a gutter edge 7 by which rain deposits may be carried off and is provided with vanes 8 on the under face by which moisture and other fluid particles may be deflected or otherwise disseminated. I have found it good practice to provide the hood 6 with a slight curve and to also close the ends of the said hood, as at 9.

Within the space 5, between the windshield 4 and top, I provide a curved ventilator plate 10. One edge 11 of the plate 10 is pivoted to the upper edge of the windshield 4; the opposite edge of the said plate 10 is curved at 12 to provide a lip for deflecting dust and particles of moisture.

The plate 10 is provided with an arm 14 thereon slidably confined within a standard 15 secured to the top 1. An adjusting screw 16 is arranged in the standard 15 to engage the arm 14 and thus permit said arm to be placed in any position desired. Through movement of the arm 14 the ventilator plate 10 may be opened or closed relative to the curved hood 6. By regulating the amount of space between the plate 10 and hood 6 the volume and amount of air desired to be admitted into or withdrawn from the interior of the automobile body may be regulated and controlled. Air striking the windshield 4 is swirled as indicated by the arrows. The curvature of both the ventilator plate 10 and the hood 6 practically reverses the direction of movement of the air that is deflected into contact therewith by the windshield 4. Dust and particles of moisture that circulate in the manner described either collect upon the deflector 17 or else are dropped onto the tonneau. During the most inclement weather I have found that by properly regulating the space between the ventilator plate 10 and hood 6 fresh, clean air may be allowed to circulate within the body of the vehicle from which dust and particles of moisture have been deflected and excluded. My experiments have also shown that the curvature of the plate 10 and hood 6 causes the incoming air to be swirled and directed downwardly from the hood 6 causing a partial suction of the air to draw the air within the car outwardly through the space between the plate 10 and ventilator.

In the modification shown in Fig. 5, I provide a stationary plate 17 in the space between the windshield and visor. The plate 17 is slotted longitudinally at 18 and over said slot I have arranged slide covers 19 which may be placed to either cover or uncover the slot 18 and thus regulate and control the volume and amount of air to be admitted into and through said slot 18.

Having thus described this invention, what I claim and desire to secure by Letters Patent is:—

1. In apparatus of the class described a windshield having an opening therein; a visor projecting angularly from said windshield; and a plate, hingedly mounted along its bottom side in the opening in said windshield, and movable in cooperative relation to said visor.

2. In combination, an automobile body; a windshield enclosing substantially the front end of said body; a hood secured to said body and projecting at an angle to the upper edge of said windshield; a deflector pivoted along its bottom side to said windshield and movable in cooperative relation to said hood.

3. In combination, a "closed-body" type of vehicle; a windshield on said vehicle; a hood on said body projecting from said windshield; vanes on said hood for deflecting dust and fluid particles; a ventilator plate interposed between said windshield and hood; means on said plate for deflecting dust and fluid particles; and a control bar connected to said body and ventilator plate to open said plate in relation to said hood.

In testimony whereof, I have hereunto set my hand at San Francisco, California, this 12th day of November, 1923.

GUSTAVE O. HEINE.